(12) United States Patent
Sakai

(10) Patent No.: US 8,914,083 B2
(45) Date of Patent: Dec. 16, 2014

(54) PORTABLE ELECTRONIC DEVICE HAVING LOOP ANTENNA ARRANGEMENT

(75) Inventor: Hiroshi Sakai, Yokohama (JP)

(73) Assignee: Kyocera Corporation, Kyoto (JP)

( * ) Notice: Subject to any disclaimer, the term of this patent is extended or adjusted under 35 U.S.C. 154(b) by 446 days.

(21) Appl. No.: 13/404,336

(22) Filed: Feb. 24, 2012

(65) Prior Publication Data

US 2012/0218695 A1   Aug. 30, 2012

(30) Foreign Application Priority Data

Feb. 24, 2011   (JP) .................................. 2011-037889

(51) Int. Cl.
| | |
|---|---|
| H04M 1/00 | (2006.01) |
| H01Q 1/24 | (2006.01) |
| H01Q 7/00 | (2006.01) |
| H01Q 9/14 | (2006.01) |
| H04M 1/725 | (2006.01) |

(52) U.S. Cl.
CPC ................. *H01Q 1/243* (2013.01); *H01Q 7/00* (2013.01); *H01Q 9/145* (2013.01); *H04M 1/7253* (2013.01)
USPC ..................................... 455/575.7; 455/575.3

(58) Field of Classification Search
CPC ... H04Q 1/243; H04M 1/0214; H04M 1/0216
USPC ............................................ 455/575.7, 575.3
See application file for complete search history.

(56) References Cited

U.S. PATENT DOCUMENTS 5,451,965 A * 9/1995 Matsumoto ................... 343/702
2005/0186931 A1 * 8/2005 Laiho et al. ................... 455/280

FOREIGN PATENT DOCUMENTS

JP   5-114055 A   5/1993
JP   2007-336480 A   12/2007

* cited by examiner

*Primary Examiner* — Omoniyi Obayanju
(74) *Attorney, Agent, or Firm* — Hoffmann & Baron, LLP

(57) ABSTRACT

A portable electronic device determines to which processing portion a signal received by a loop antenna is suited and can preferably perform different types of noncontact communication. The portable electronic device includes: an antenna including a first loop portion and a second loop portion; a signal processing portion that processes a signal received at the antenna; a signal detection portion; and in a state in which a single loop antenna formed by the first loop portion and the second loop portion is connected with the signal detection portion, a control portion that delivers a signal received at the single loop antenna to the signal processing portion, and delivers a signal received at the first loop portion to the signal processing portion.

6 Claims, 8 Drawing Sheets

PORTABLE ELECTRONIC DEVICE HAVING LOOP ANTENNA ARRANGEMENT

This application is based on and claims the benefit of priority from Japanese Patent Application No. 2011-37889, filed on 24 Feb. 2011, the content of which is incorporated herein by reference.

BACKGROUND OF THE INVENTION

1. Field of the Invention

The present invention relates to a portable electronic device having a loop antenna.

2. Related Art

Among existing portable electronic devices, there are those provided with a communication processing portion (RFID: Radio Frequency Identification Device) that performs non-contact communication using a loop antenna arranged inside the body thereof with an external device (for example, refer to Japanese Unexamined Patent Application, Publication No. 2007-336480). The portable electronic devices perform authentication processing while entering/exiting a room in a facility by using the communication processing portion, for example.

Furthermore, among existing portable electronic devices, there are those provided with a power processing portion that uses a loop antenna arranged inside the body thereof to perform electromagnetic coupling with an external device, thereby receiving electronic power supply (for example, refer to Japanese Unexamined Patent Application, Publication No. H05-114055).

SUMMARY OF THE INVENTION

However, this communication processing portion and power processing portion respectively perform processing within a predetermined range by receiving, by way of a loop antenna, electromagnetic waves radiated from an external device.

In this regard, in a case of assuming a portable electronic device including both this communication processing portion and power processing portion, it is necessary to have a configuration that determines to which processing portion the signal received at the antenna 33 is suited and performs switching, in order to avoid a signal for communication received at the loop antenna from being supplied to the power processing portion, and a signal for power supply received at the loop antenna from being supplied to the communication processing portion.

It is an object of the present invention to provide a portable electronic device that can determine to which processing portion a signal received by a loop antenna is suited and can perform different types of noncontact communication.

In order to achieve the abovementioned object, a portable electronic device according to the present invention includes a body; an antenna including a first loop portion and a second loop portion, each being arranged at a different position of the body; a signal processing portion that processes a signal received at the antenna; a signal detection portion that detects a first signal or a second signal received at the antenna; and a control portion that, in a state in which a single loop antenna formed by the first loop portion and the second loop portion is connected with the signal detection portion, delivers a signal received at the single loop antenna to the signal processing portion, in a case of the first signal being detected by the signal detection portion, and delivers a signal received by the first loop portion to the signal processing portion, in a case of the second signal being detected at the signal detection portion.

Furthermore, in the portable electronic device, in a state in which a single loop antenna formed by the first loop portion and the second loop portion is connected with the signal detection portion, the control portion delivers the signal received by the first loop portion to the signal processing portion and delivers the signal received by the second loop portion to the signal detection portion in a case of the second signal being detected at the signal detection portion, and delivers the signal received by the first loop portion to the signal detection portion and delivers the signal received by the second loop portion to the signal processing portion in a case of the second signal being detected by the signal detection portion that is connected with the second loop portion.

Furthermore, in the portable electronic device, the body includes a first face and a second face that face each other; the first loop portion is disposed at the first face of the body; and the second loop portion is disposed at the second face of the body.

Furthermore, in the portable electronic device, the body includes: a first body including the first face; a second body including the second face; and a coupling portion that couples the first body and the second body to be openable and closable around an opening-closing axis so as to be able to enter: a closed state in which the first body and the second body are disposed to be layered with a face of the first body on an opposite side to the first face and a face of the second body on an opposite side to the second face facing each other; and an opened state in which the first body and the second body are aligned in a predetermined direction with the first face and the second face being separated from each other, and in which, upon the single loop antenna being formed in the opened state, the first loop portion and the second loop portion are disposed at the first body or the second body, respectively, so as to suppress cancellation between the signal received at the first loop portion and the signal received at the second loop portion Furthermore, the portable electronic device further includes: a magnetic field shielding member disposed in at least one of the first body and the second body, in which the first loop portion and the second loop portion are respectively disposed at the first body or the second body, so that a loop direction of the first loop portion when viewed in the layering direction of the first body and the second body and a loop direction of the second loop portion when viewed in the layering direction in the closed state are opposite directions to each other, and in which the magnetic field shielding member is disposed between the first loop portion and the second loop portion in the closed state.

Furthermore, in the portable electronic device, the first loop portion is disposed in a region of the first body at a side of the coupling portion; and the second loop portion is disposed in a region of the second body at a side of the coupling portion.

Moreover, a portable electronic device according to the present invention includes: a body; an antenna including a first loop portion and a second loop portion, each being disposed at a different position inside the body; a first signal processing portion and a second signal processing portion that process signals received at the antenna, respectively; a signal detection portion that is connected with the first signal processing portion and detects a first signal or a second signal received at the antenna; and a control portion that, in a state in which a single loop antenna formed by the first loop portion and the second loop portion is connected with the signal detection portion, processes a signal received at the single loop antenna by way of the first signal processing portion in a case of the first signal being detected by the signal detection portion, and connects the first loop portion with the second signal processing portion and connects the second loop portion with the signal detection portion in a case of the second signal being detected by the signal detection portion.

Furthermore, in the portable electronic device, the control portion connects the first loop portion with the signal detection portion and connects the second loop portion with the second signal processing portion in a case of the second signal being detected by the signal detection portion that is connected with the second loop portion.

In accordance with the portable electronic device according to the present invention, it is possible to determine to which processing portion a signal received by a loop antenna is suited and perform different types of noncontact communication.

DETAILED DESCRIPTION OF THE INVENTION

Figure 1:
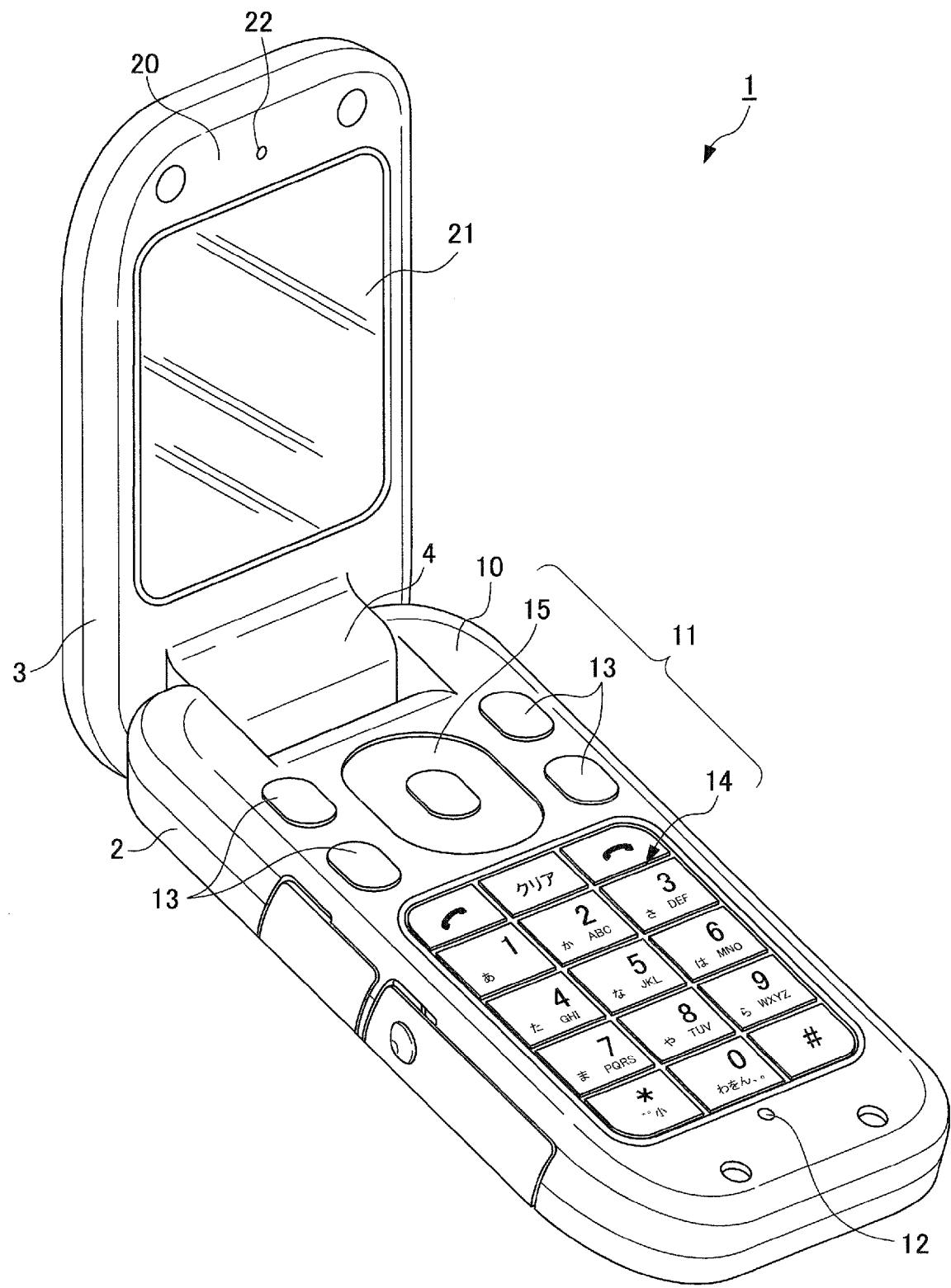
FIG. 1 is a view showing an appearance of a cellular telephone device.

In the following, the embodiments of the present invention will be explained. FIG. 1 is a perspective view showing an appearance of a cellular telephone device 1 as an example of a portable electronic device according to the present invention. It should be noted that, although FIG. 1 shows the form of a so-called folder-type cellular telephone device, the form of the cellular telephone device according to the present invention is not limited thereto. For example, the type of the cellular telephone device may be a slider type in which one of the bodies slides to one direction in a state in which the bodies are mutually superimposed; and a rotating (turning) type in which one of the bodies is rotated around an axis line along the direction of superimposing the bodies.

As shown in FIG. 1, the cellular telephone device 1 is configured to include an operation-unit side body 2 (first body) and a display-unit side body 3 (second body). The operation-unit side body 2 is configured to include, on a front face portion 10 (first face) thereof, a group of operation buttons 11 and a sound input portion 12 to which sound produced by a user of the cellular telephone device 1 during a phone call is input. The group of operation buttons 11 is configured with: function setting operation buttons 13 for operating various functions such as for various setting functions, a telephone number directory function and a mail function; input operation buttons 14 for inputting the digits of a telephone number and characters such as for mail, etc.; and a selection operation button 15 for performing selection of various operations, scrolling, etc.

Furthermore, the display-unit side body 3 is configured to include, on a front face portion 20 (second face), a display 21 for displaying a variety of information, and a sound output portion 22 for outputting the sound of the other party of the phone call. In addition, the abovementioned group of operation buttons 11, sound input portion 12, display 21, and sound output portion 22 are configured as a part of a processing unit 71 described in detailed later.

In addition, an upper end portion of the operation-unit side body 2 and a lower end portion of the display-unit side body 3 are connected via a hinge mechanism 4. Moreover, the cellular telephone device 1 can be configured to be movable relatively between a state where the operation-unit side body 2 and the display-unit side body 3 are apart from each other (opened state) and a state where the operation-unit side body 2 and the display-unit side body 3 are contacting each other (folded state), by relatively pivoting the operation-unit side body 2 and the display-unit side body 3 connected via the hinge mechanism 4.

The cellular telephone device 1 with such a configuration has a function of performing preferable communication processing and power processing based on a signal received by a built-in loop antenna. In the following, a configuration example for realizing this function will be explained.

Figure 2A:
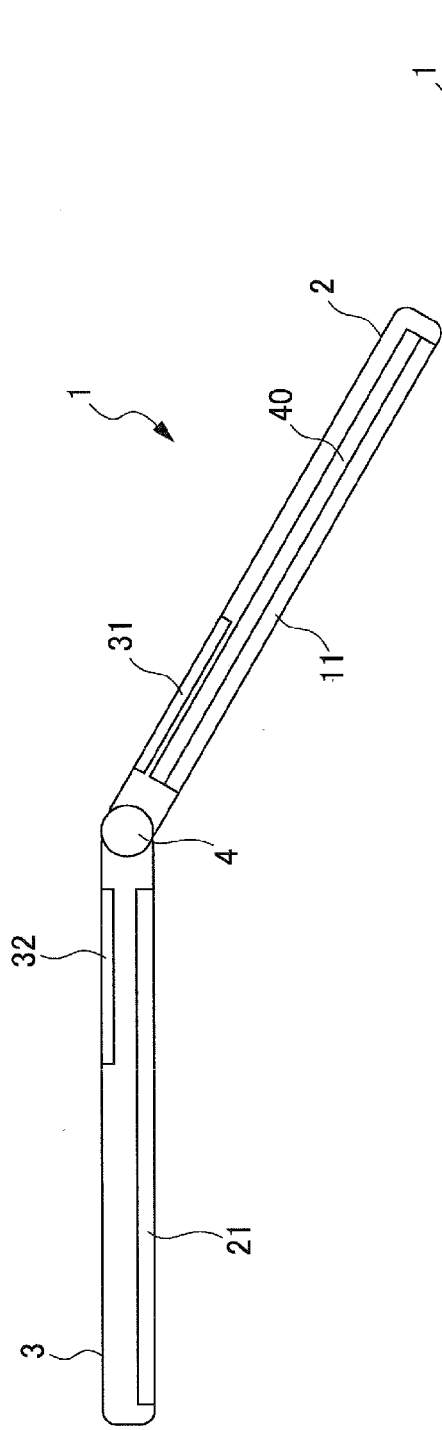
FIG. 2 is a functional block diagram showing functions of the cellular telephone device.
Figure 2B:
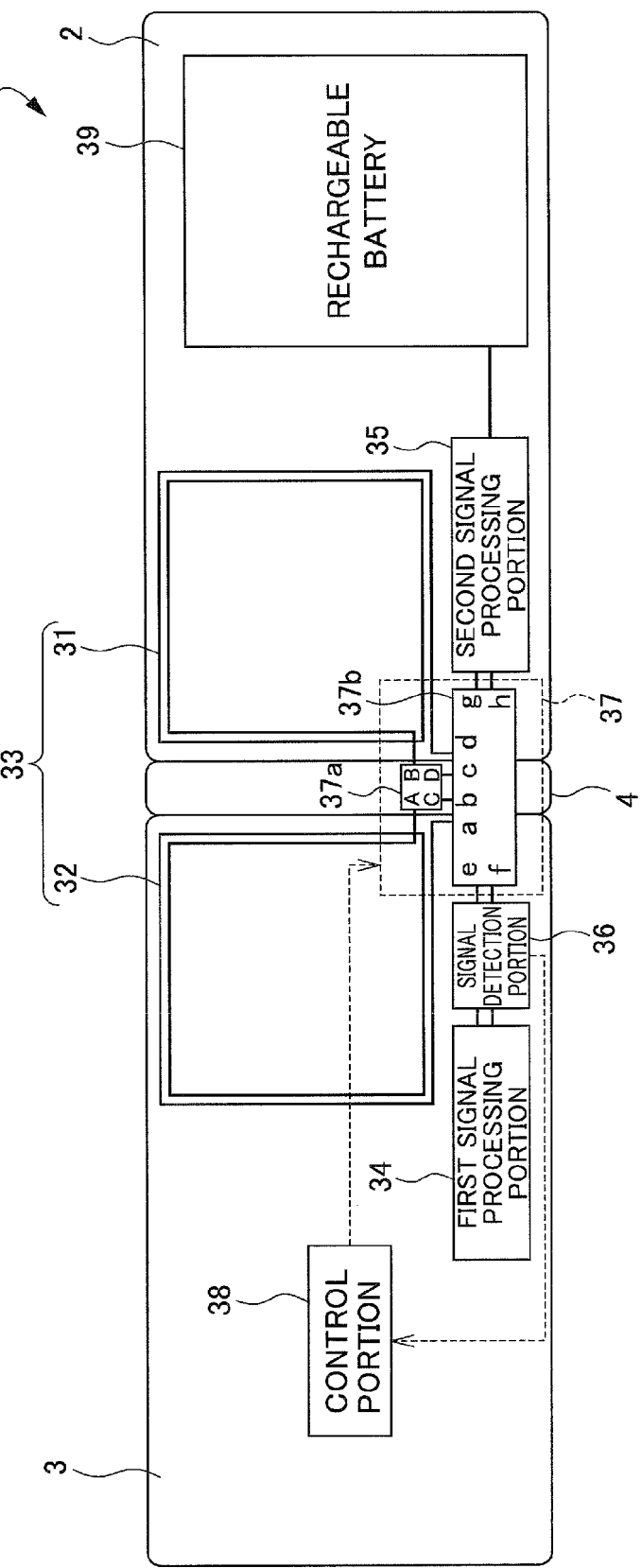

As shown in FIG. 2, the cellular telephone device 1 includes an antenna 33, a first signal processing portion 34, a second signal processing portion 35, a signal detection portion 36, a selection portion 37, a control portion 38, and a rechargeable battery 39. It should be noted that, although a configuration is described as an example in which the first signal processing portion 34, the signal detection portion 36, and the control portion 38 are arranged at the display-unit side body 3; the second signal processing portion 35 and the rechargeable battery 39 are arranged at the operation-unit side body 2; and the selection portion 37 is arranged in the proximity of the hinge mechanism 4 in the present embodiment, the arrangement of each portion is not limited thereto.

The antenna 33 includes a first loop portion 31 and a second loop portion 32, each being arranged at a different position inside the body. It should be noted that, although the antenna 33 is arranged inside the operation-unit side body 2 and the display-unit side body 3 in FIG. 2, it may be arranged at a surface of each body forming the exterior of the body.

As shown in FIG. 2, regarding the first loop portion 31, a copper wire or the like having a predetermined diameter (for example, approximately 0.1 mm) is wound a plurality of times in a spiral manner so as to create a loop of a predetermined size, thereby forming a coil at the operation-unit side body 2.

Furthermore, as shown in FIG. 2, for the second loop portion 32, a copper wire or the like having a predetermined diameter (for example, approximately 0.1 mm) is wound at a plurality of times in a spiral manner so as to create a loop of a predetermined size of loop, thereby forming a coil at the display-unit side body 3.

The first signal processing portion 34 configures an RFID processing portion, performs predetermined signal processing based on a first signal S1 received by the antenna 33, and performs authentication processing for entering/exiting a room in a facility, for example.

The second signal processing portion 35 configures a charging circuit portion having a function of charging the rechargeable battery 39 (wireless charging function) based on a wireless (noncontact) charging system from a charger (a charging base) and performs predetermined processing based on a second signal S2 received at the antenna 33 to charge the rechargeable battery 39.

Furthermore, the signal detection portion 36 is provided between the antenna 33 and the first signal processing portion 34 and detects the first signal S1 or the second signal S2.

The selection portion 37 is configured so as to enable selecting control by the control portion 38 between: a first state in which one of the respective ends of the first loop portion 31 and the second loop portion 32 are connected with each other to form the antenna 33 in a loop manner, while the other one of the respective ends of the first loop portion 31 and the second loop portion 32 are connected with the signal detection portion 36; and a second state in which the one end and the other end of the first loop portion 31 are connected to the second signal processing portion 35, while the one end and the other end of the second loop portion 32 are connected to the signal detection portion 36.

Furthermore, as shown in FIG. 2, the selection portion 37 is configured by a first selection portion 37a and a second selection portion 37b. The first selection portion 37a includes an A-terminal, a B-terminal, a C-terminal, and a D-terminal. The second selection portion 37b includes an a-terminal, a b-terminal, a c-terminal, a d-terminal, an e-terminal, an f-terminal, a g-terminal, and an h-terminal.

Moreover, the first loop portion 31 configuring the antenna 33 is connected to the first selection portion 37a at one end side thereof and is connected to the second selection portion 37b at the other end side thereof. Furthermore, the second loop portion 32 configuring the antenna 33 is connected to the first selection portion 37a at one end side thereof and is connected to the second selection portion 37b at the other end side thereof.

In a case in which the first signal S1 is detected by the signal detection portion 36 in the first state, the control portion 38 controls to cause the first signal processing portion 34 to process the first signal S1, and in a case in which the second signal S2 is detected by the signal detection portion 36, the control portion 38 controls the selection portion 37 so as to switch from the first state to the second state.

Figure 3:
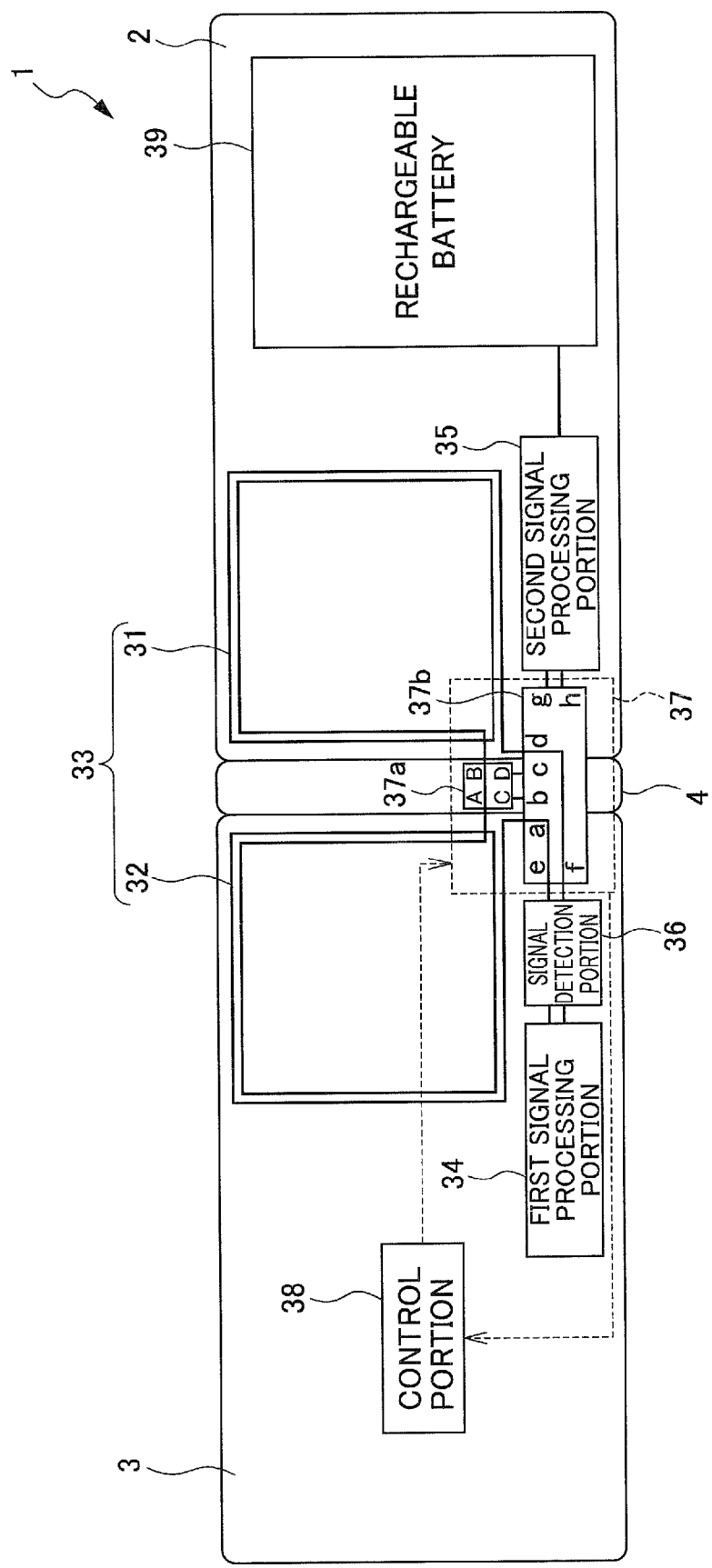
FIG. 3 is a view for explaining a switching state of a selection portion in a first state.

Here, a switching state between the first selection portion 37a and the second selection portion 37b in the first state will be explained. As shown in FIG. 3, the control portion 38 performs switching control so that the A-terminal is electronically connected with the B-terminal at the first selection portion 37a, and performs switching control so that the a-terminal is electronically connected with the c-terminal and the d-terminal is electronically connected with the f-terminal of the second selection portion 37b, in the first state.

Figure 4:
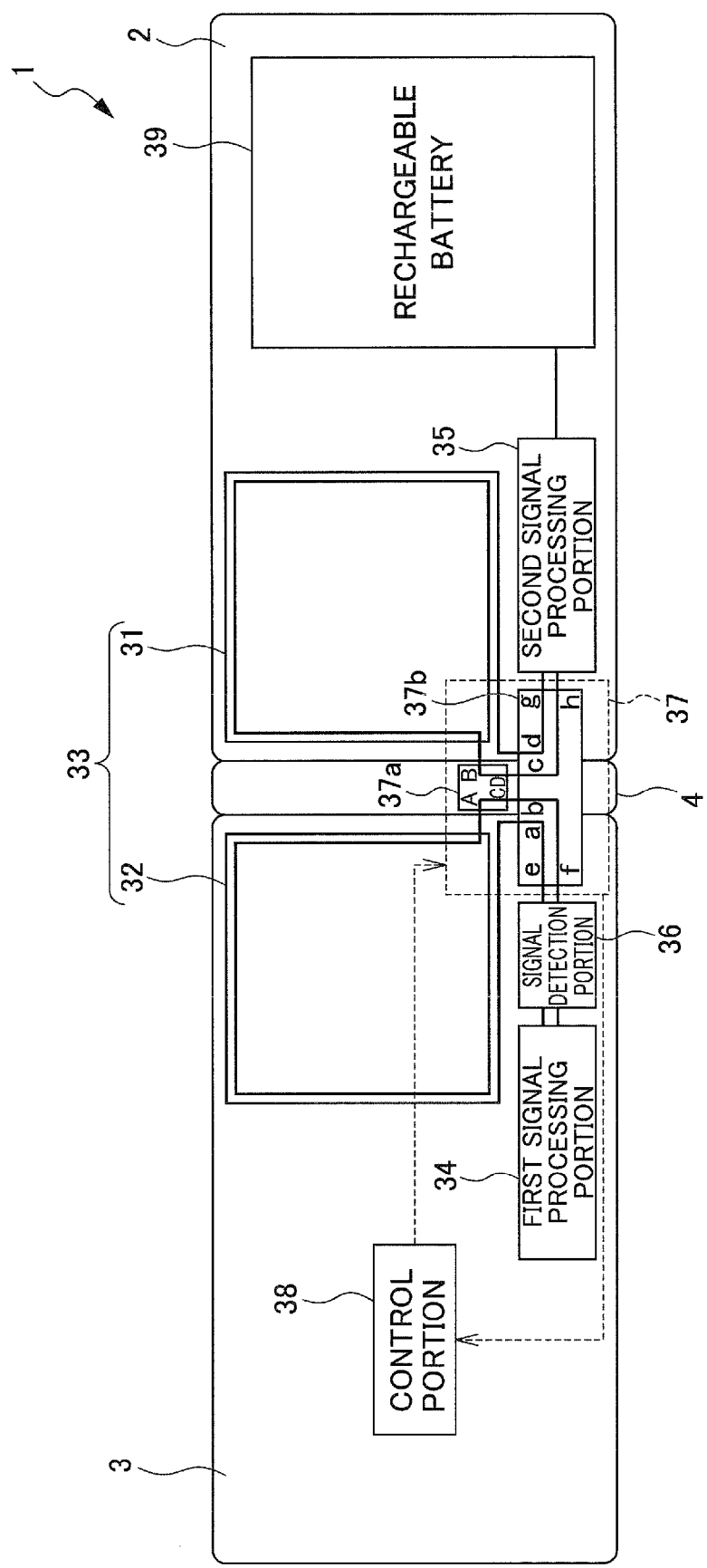
FIG. 4 is a view for explaining a switching state of a selection portion in a second state.

Next, a switching state between the first selection portion 37a and the second selection portion 37b in the second state will be explained. As shown in FIG. 4, the control portion 38 performs switching control so that the A-terminal is electronically connected with the C-terminal and the B-terminal is electronically connected with the D-terminal at the first selection portion 37a, and performs switching control so that the a-terminal is electronically connected with the e-terminal, the b-terminal is electronically connected with the f-terminal, the c-terminal is electronically connected with the h-terminal, and the d-terminal is electronically connected with the g-terminal at the second selection portion 37b, in the second state.

Here, specific operations of the first signal processing portion 34 will be explained. In the following, an explanation will be provided assuming the processing of entering a facility. Furthermore, with respect to a reader/writer device (external device) installed outside of a facility in advance, predetermined registration processing is performed for permitting entrance into the facility, and thus the cellular telephone device 1 is a device acquiring a predetermined password.

A user brings the cellular telephone device 1 close to the external device installed outside the facility within a predetermined distance.

The first signal processing portion 34 receives, by way of the antenna 33, a signal (the first signal S1) transmitted from the external device. It should be noted that the first signal S1 is a signal for which a predetermined usable frequency (for example, 13.56 MHz) is set as a carrier wave.

The first signal processing portion 34 performs signal processing such as demodulation on the signal received by the antenna 33 and reads from memory (not illustrated) a password based on the processed signal (password request signal) to generate a signal for which a predetermined usable frequency is set as a carrier wave.

The cellular telephone device 1 transmits the signal thus generated to the external device. The external device extracts a password based on the signal received, performs authentication processing, and performs processing such as opening a door of the facility in the case of determining the password to be correct.

Furthermore, the first signal processing portion 34 may be of: active type that is driven based on the power fed from the rechargeable battery 39; so-called passive induction field type (electromagnetic induction type) in which an electromotive force is generated by an electromagnetic induction effect utilizing electromagnetic waves generated by an external device; passive mutual induction type (electromagnetic coupling type); radiated electromagnetic field type (radiowave type); or the like. In addition, the access method for the first signal processing portion 34 may be a read/write type, read-only type, write-once type, or the like.

Next, specific operations of the second signal processing portion 35 will be explained. It should be noted that, although the electromagnetic induction type, the radiowave receiving type, and the resonance type have thus far been proposed for wireless charging, an explanation will be provided with the example of a case of employing the electromagnetic induction type in the present embodiment.

A user places the cellular telephone device 1 on a charger.

The second signal processing portion 35 receives a signal (second signal S2) transmitted from the charger at the antenna 33, converts the electronic current generated by electromagnetic induction into predetermined electronic current, and supplies the electronic current after conversion to the rechargeable battery 39, thereby charging the rechargeable battery 39.

Since the cellular telephone device 1 performs switching control to the first state in an initial (default) state so as to connect the first loop portion 31 with the second loop portion 32, it is possible to supply a signal to the signal detection portion 36 reliably regardless of at which loop the signal is received.

Therefore, in a case in which the signal received at the antenna 33 (first loop portion 31 or second loop portion 32) by the signal detection portion 36 is determined as being the first signal S1, since the cellular telephone device 1 can deliver the first signal S1 unaltered to the first signal processing portion 34, it is possible to perform preferable communication processing.

Furthermore, in a case in which the signal received at the antenna 33 (first loop portion 31 or second loop portion 32) by the signal detection portion 36 is determined as being the second signal S2, the cellular telephone device 1 switches the selection portion 37 from the first state to the second state to connect the first loop portion 31 with the second signal processing portion 35 and to connect the second loop portion 32 with the first signal processing portion 34.

Since the signal received at the first loop portion 31 is delivered to the second signal processing portion 35 in this way, if the signal is the second signal S2, it is possible to preferably perform charge processing at the second signal processing portion 35.

Furthermore, since the signal received at the second loop portion 32 is delivered to the signal detection portion 36, if the signal is the first signal S1, it is possible to preferably perform communication processing at the first signal processing portion 34.

Figure 5:
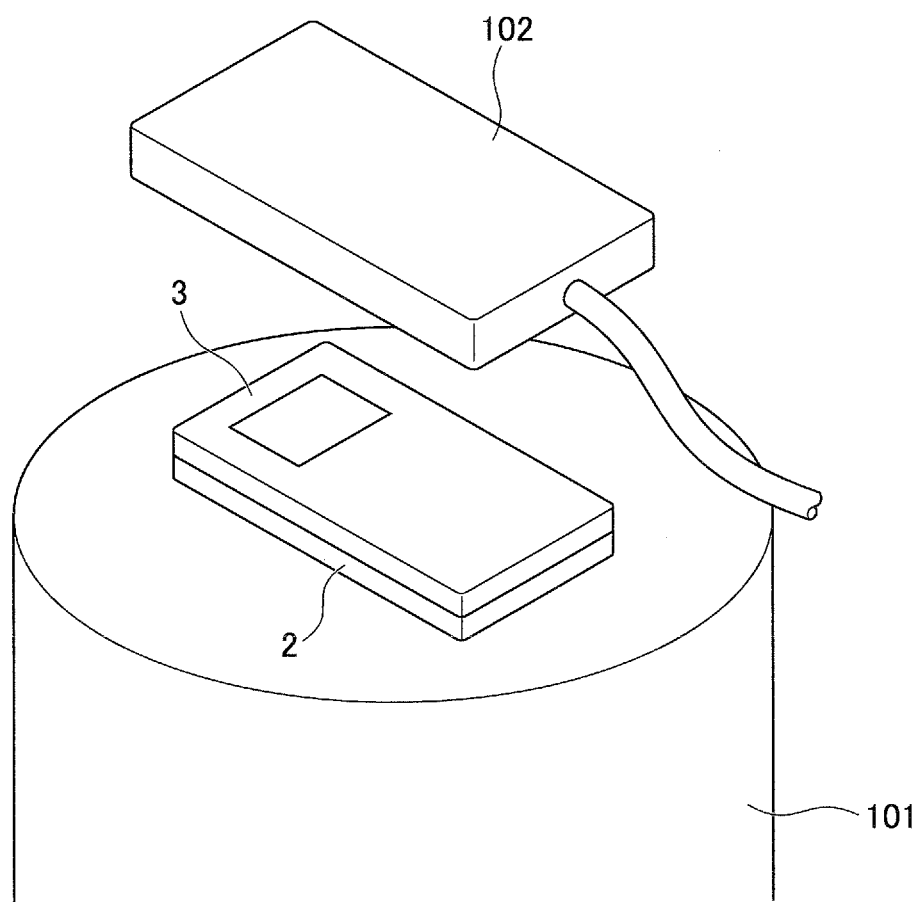
FIG. 5 is a view showing a state when an operation-unit side body is placed to face a charger, and an external device is brought close to a display-unit side body

It should be noted that FIG. 4 shows a switching state between the first selection portion 37a and the second selection portion 37b when the cellular telephone device 1 is in a closed state. For example, with the operation-unit side body 2 being placed to face the charger 101 (charging base) in the closed state, the cellular telephone device 1 can perform charge processing by delivering the second signal S2 received at the first loop portion 31 to the second signal processing portion 35, and with the display-unit side body 3 facing the external device 102, the cellular telephone device 1 can perform communication processing by delivering the first signal S1 received at the second loop portion 32 to the first signal processing portion 34 (refer to FIG. 5).

In addition to the first state and the second state, the selection portion 37 is configured so as to enable selective control by the control portion 38 of a third state in which one end and the other end of the first loop portion 31 are connected with the signal detection portion 36, while one end and the other end of the second loop portion 32 are connected with the second signal processing portion 35. In a case in which the second signal S2 is detected by the signal detection portion 36 in the second state, the control portion 38 selects the third state by way of the selection portion 37.

Figure 6:
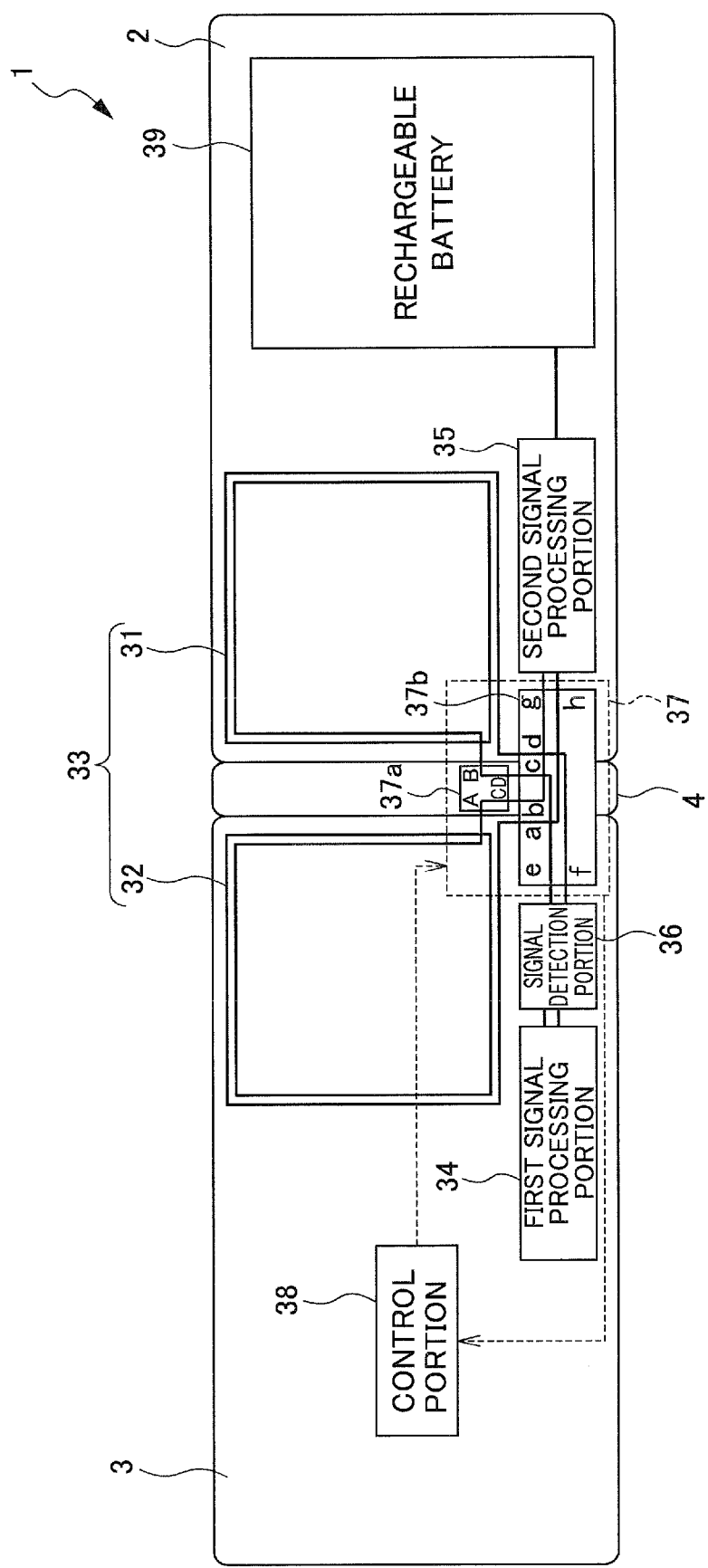
FIG. 6 is a view for explaining a switching state of a selection portion in a third state.

More specifically, as shown in FIG. 6, the control portion 38 selects the third state by performing switching control so that the A-terminal is electronically connected with the C-terminal and the B-terminal is electronically connected with the D-terminal at the first selection portion 37a, and performs switching control so that the a-terminal is electronically connected with the h-terminal, the b-terminal is electronically connected with the g-terminal, the c-terminal is electronically connected with the e-terminal, and the d-terminal is electronically connected with the f-terminal at the second selection portion 37b.

In a case in which the signal received at the antenna 33 (the second loop portion 32) by the signal detection portion 36 is determined as being the second signal S2 in the second state, the cellular telephone device 1 switches the selection portion 37 from the second state to the third state to connect the first loop portion 31 with the signal detection portion 36 and to connect the second loop portion 32 with the second signal processing portion 35.

Therefore, since the cellular telephone device 1 can supply the signal received at the second loop portion 32 (second signal S2) to the second signal processing portion 35, it is possible to preferably perform charging processing.

Furthermore, since the cellular telephone device 1 supplies the signal received at the first loop portion 31 to the signal detection potion 36, if the signal is the first signal S1, it is possible to preferably perform communication processing at the first signal processing portion 34.

Figure 7:
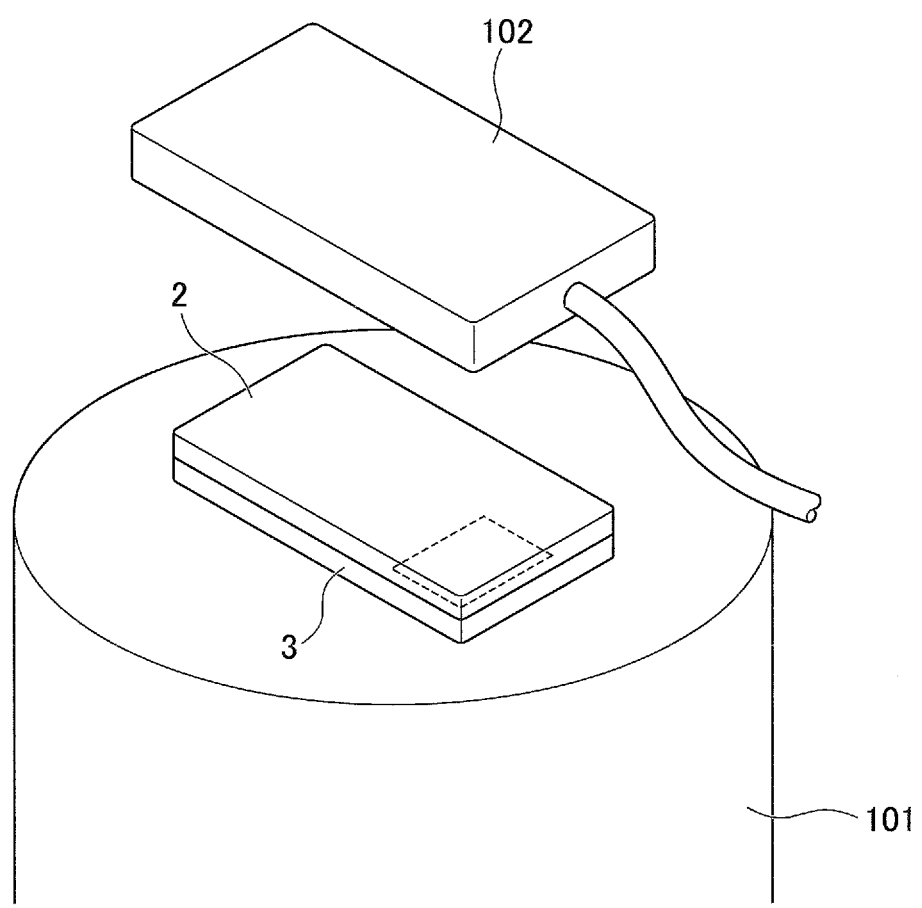
FIG. 7 is a view showing a state when the display-unit side body is placed to face a charger, and an external device is brought close to the operation-unit side body.

It should be noted that FIG. 6 shows a switching state between the first selection portion 37a and the second selection portion 37b when the cellular telephone device 1 is in a closed state. For example, with the display-unit side body 3 being placed to face the charger 101 (charging base) in the closed state, the cellular telephone device 1 can perform charge processing by supplying the second signal S2 received at the second loop portion 32 to the second signal processing portion 35, and with the operation-unit side body 2 facing the external device 102, the cellular telephone device 1 can perform communication processing by supplying the first signal S1 received at the first loop portion 31 to the first signal processing portion 34 (refer to FIG. 7).

Furthermore, as described above, the cellular telephone device 1 includes the first face (front face portion 10 of the operation-unit side body 2) and the second face (front face portion 20 of the display unit side portion 3), which face each other. Moreover, the first loop portion 31 is arranged at the operation-unit side body 2 and the second loop portion 32 is arranged at the display-unit side portion 3.

By configuring in this way, the cellular telephone device 1 can be applied to a folder-type cellular telephone device and it is possible to preferably perform the abovementioned authentication processing and charging processing in the closed state.

Moreover, even for a cellular telephone device of so-called a straight type having a single body, the same effects are also exerted so long as the loop portions are arranged at a first face and a second face facing each other of the single body, respectively.

Furthermore, as described above, the cellular telephone device 1 includes the hinge mechanism 4 (coupling portion) that couples the operation-unit side body 2 and the display-unit side body 3 so as to be openable and closable around an opening-closing axis, so as to be able to enter: the closed state in which with a face of the operation-unit side body 2 on an opposite side to the front face portion 10 and a face of the display-unit side body 3 on an opposite side to the front face portion 20 facing each other; and the opened state in which the operation-unit side body 2 and the display-unit side body 3 are arranged to be aligned in a predetermined direction with the front face portion 10 and the front face portion 20 being spaced away from each other.

Upon the single loop antenna 33 being formed in the opened state, the first loop portion 31 and the second loop portion 32 are arranged at the operation-unit side body 2 and the display-unit side body 3, respectively, so as to suppress cancellation between a signal received at the first loop portion 31 and a signal received at the second loop portion 32.

By configuring in this way, due to being arranged at the operation-unit side body 2 and the display-unit side body 3, respectively, so that the cancellation between the signal received at the first loop portion 31 and the signal received at the second loop portion 32 is suppressed, the cellular telephone device 1 can preferably perform communication processing as well as power processing at the same time.

Furthermore, the first loop portion 31 and the second loop portion 32 are arranged at the operation-unit side body 2 or the display-unit side body 3, respectively, so that a loop direction of the first loop portion 31 when viewed in the layering direction of the operation-unit side body 2 and the display-unit side body 3 in the closed state and a loop direction of the second loop portion 32 when viewed in the layering direction become opposite direction to each other.

Furthermore, as shown in FIG. 2, the cellular telephone device 1 includes a magnetic field shielding member 40 arranged in at least one of the operation-unit side body 2 and the display-unit side body 3. The magnetic field shielding member 40 is arranged between the first loop portion 31 and the second loop portion 32 in the closed state. It should be noted that FIG. 2(a) shows an example in which the magnetic field shielding member 40 is arranged at a side of the operation-unit side body 2. Furthermore, the first loop portion 31 is arranged in a region on a side of the coupling portion of the operation-unit side body 2. The second loop portion 32 is arranged in a region on a side of the coupling portion of the display-unit side body 3. Furthermore, the cellular telephone device 1 may not be configured with the magnetic field shielding member 40 as a dedicated member, and may be configured to use a circuit substrate or a shielded substrate as a magnetic field shielding member.

Therefore, it is possible for the cellular telephone device 1, upon a signal being received simultaneously at a plurality of loop portions, to suppress cancellation of the magnetic flux generated at each loop portion due to the loop direction of the first loop portion 31 and the loop direction of the second loop portion 32 when viewed in the layering direction in the closed state being opposite directions.

Figure 8:
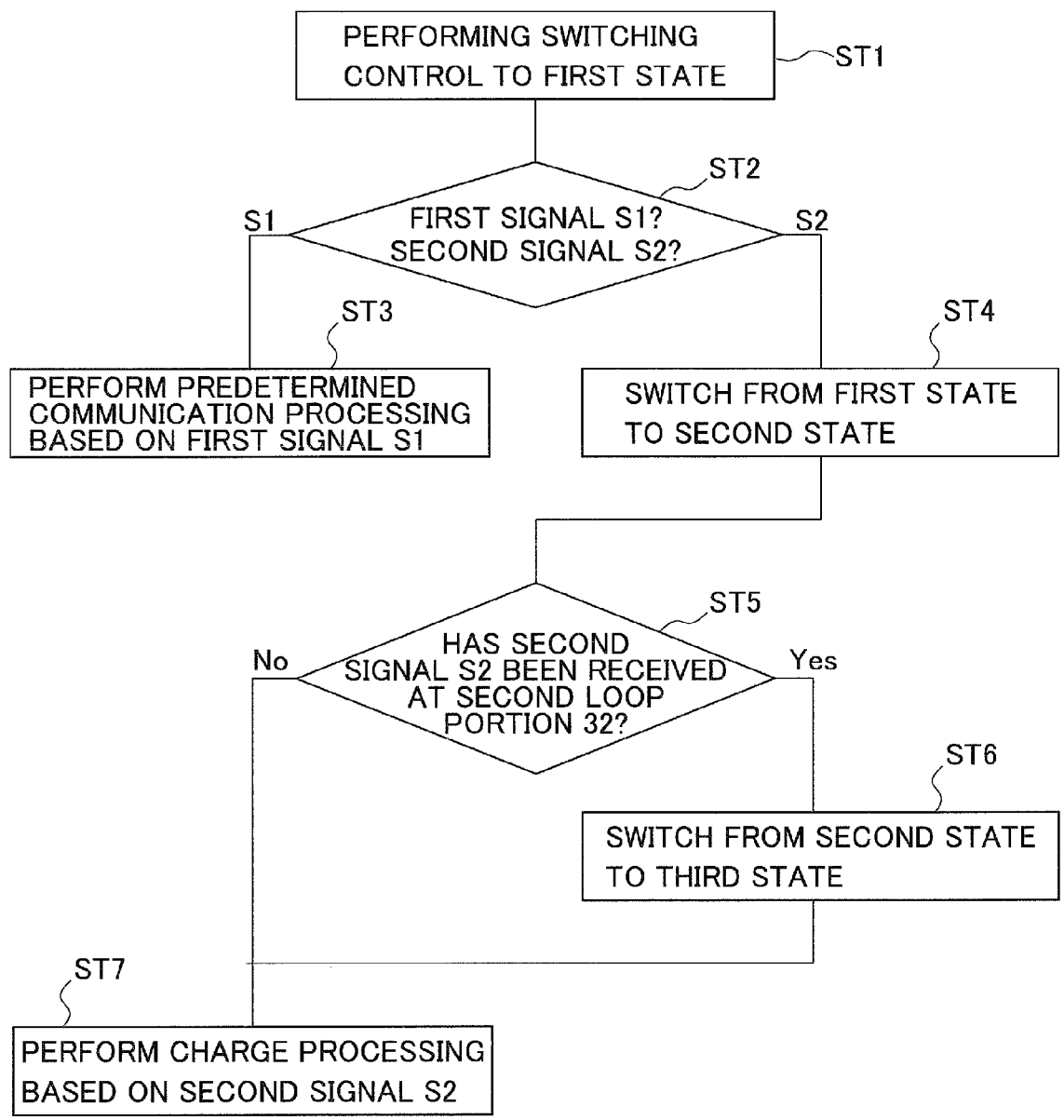
FIG. 8 is a flowchart for explaining operation of the cellular telephone device.

Next, operation of the cellular telephone device 1 will be explained with reference to the flowchart shown in FIG. 8.

In Step ST1, the control portion 38 controls the first selection portion 37*a* and the second selection portion 37*b* to perform switching control to the first state as a default state (refer to FIG. 3).

In Step ST2, the signal detection portion 36 detects a signal received at the antenna 33 (first loop portion 31 or second loop portion 32) and determines whether the signal detected is the first signal S1 or the second signal S2. In a case of determining to be the first signal S1, the processing advances to Step ST3, and in a case of determining to be the second signal S2, the processing advances to Step ST4.

Here, the first signal S1 and the second signal S2 differ in the frequency of the carrier wave, demodulation method, and the like. Therefore, the control portion 38 can determine whether the signal received at the antenna 33 is the first signal S1 or the second signal S2 based on these differences.

In Step ST3, the first signal processing portion 34 performs predetermined communication processing based on the first signal S1.

In Step ST4, the control portion 38 controls the selection portion 37 to switch from the first state to the second state (refer to FIG. 4). It should be noted that only the second loop portion 32 is connected to the signal detection portion 36 in the second state.

In Step ST5, the signal detection portion 36 determines whether the signal (second signal S2) is received at the antenna 33 (second loop portion 32). In a case of determining to be receiving at the antenna 33 (YES), the processing advances to Step ST6, and in a case of determining to not be receiving at the antenna 33 (NO), the processing advances to Step ST7.

In Step ST6, the control portion 38 controls the selection portion 37 to switch from the second state to the third state (refer to FIG. 6). It should be noted that only the first loop portion 31 is connected to the signal detection portion 36 in the third state.

In Step ST7, the second signal processing portion 35 performs charge processing based on the second signal S2.

By configuring in this way, the cellular telephone device 1 can determine to which processing portion the signal received at the antenna 33 is suited, and thus perform preferable communication processing and power processing.

It should be noted that, although the signal detection portion 36 is explained as being arranged between the first signal processing portion 34 and the selection portion 37 in the present embodiment, it is not limited thereto, and may be a configuration arranged between the second signal processing portion 35 and the selection portion 37.

Furthermore, in the abovementioned embodiment, although the second loop portion 32 is connected with the signal detection portion 36 while the first loop portion 31 is connected with the second signal processing portion 35 in the second state, and the first loop portion 31 is connected with the signal detection portion 36 while the second loop portion 32 is connected with the second signal processing portion 35 in the third state, the present invention is not limited thereto. For example, it may be configured such that the first loop portion 31 is connected with the signal detection portion 36 while the second loop portion 32 is connected with the second signal processing portion 35 in the second state, and the second loop portion 32 is connected with the signal detection portion 36 while the first loop portion 31 is connected with the second signal processing portion 35 in the third state.

Moreover, although the first signal processing portion 34 and the second signal processing portion 35 are provided to the cellular telephone device 1 to be independent from each other in the abovementioned embodiment, the present invention is not limited thereto. A single signal processing portion may include both the first signal processing portion 34 and the second signal processing portion 35, or a single signal processing portion may process each of the first signal S1 and the second signal S2 received at the antenna 33.

In this case, when the first signal S1 is detected at the signal detection portion 36 in a state in which a single loop antenna formed by the first loop portion 31 and the second loop portion 32 is connected with the signal detection portion, the control portion 38 delivers a signal received at the single loop antenna to a single signal processing portion. Furthermore, when the second signal S2 is detected at the signal detection portion 36, the control portion 38 may deliver the signal received by the first loop portion 31 to a single signal processing portion and may deliver the signal received by the second loop portion 32 to the signal detection portion 36. Then, when the second signal S2 is detected by the signal detection portion 36 that is connected with the second loop portion 32, the control portion 38 may deliver the signal received by the first loop portion 31 to the signal detection portion 36 and may deliver the signal received by the second loop portion 32 to a single signal processing portion.

In addition, although the first signal processing portion 34 transmits or receives a signal used in entrance processing for a facility in communication with the external device 102 in the abovementioned embodiment, the present invention is not limited thereto. For example, it may transmit or receive a signal used for billing processing by way of noncontact communication with an external device installed in a convenience store or the like.

Furthermore, although the abovementioned embodiment assumes noncontact communication and noncontact charging by means of a signal at 13.56 MHz, for example, as processing for transmitting/receiving the first signal S1 and the second signal S2, the present invention is not limited thereto, and may be processing performing communication with an external device by way of a loop antenna.

Moreover, although the signal detection portion 36 determines whether the signal received by any of the first loop portion 31, the second loop portion 32, and the antenna 33 consisting of the first loop portion 31 and the second loop portion 32 is the first signal S1 or the second signal S2 in the abovementioned embodiment, the present invention is not limited thereto. The signal detection portion 36 may read a portion of the signal (for example, a header portion) received at the antenna 33 and determine the type of signal received at the antenna 33 based on the portion thus read.

What is claimed is:

1. A portable electronic device, comprising:
a body;
an antenna including a first loop portion and a second loop portion, each being arranged at a different position of the body;
a signal processing portion that processes a signal received at the antenna;
a signal detection portion that detects a first signal or a second signal received at the antenna; and
a control portion that, in a state in which a single loop antenna formed by the first loop portion and the second loop portion is connected with the signal detection portion, delivers a signal received at the single loop antenna to the signal processing portion, in a case of the first signal being detected by the signal detection portion, and delivers a signal received by the first loop portion to the signal processing portion, in a case of the second signal being detected at the signal detection portion, wherein the body includes a first face and a second face that face each other, the first loop portion being disposed at the first face of the body, the second loop portion being disposed at the second face of the body,
wherein the body includes:
a first body including the first face;
a second body including the second face; and
a coupling portion that couples the first body and the second body to be openable and closable around an opening-closing axis so as to be able to enter: a closed state in which the first body and the second body are disposed to be layered with a face of the first body on an opposite side to the first face and a face of the second body on an opposite side to the second face facing each other; and an opened state in which the first body and the second body are aligned in a predetermined direction with the first face and the second face being separated from each other, and
wherein, upon the single loop antenna being formed in the opened state, the first loop portion and the second loop portion are disposed at the first body or the second body, respectively, so as to suppress cancellation between the signal received at the first loop portion and the signal received at the second loop portion.

2. The portable electronic device according to claim 1, wherein
in a state in which a single loop antenna formed by the first loop portion and the second loop portion is connected with the signal detection portion, the control portion delivers the signal received by the first loop portion to the signal processing portion and delivers the signal received by the second loop portion to the signal detection portion in a case of the second signal being detected at the signal detection portion, and delivers the signal received by the first loop portion to the signal detection portion and delivers the signal received by the second loop portion to the signal processing portion in a case of the second signal being detected by the signal detection portion that is connected with the second loop portion.

3. The portable electronic device according to claim 1, further comprising:
a magnetic field shielding member disposed in at least one of the first body and the second body,
wherein the first loop portion and the second loop portion are respectively disposed at the first body or the second body, so that a loop direction of the first loop portion when viewed in the layering direction of the first body and the second body and a loop direction of the second loop portion when viewed in the layering direction in the closed state are opposite directions to each other, and
wherein the magnetic field shielding member is disposed between the first loop portion and the second loop portion in the closed state.

4. The portable electronic device according to claim 1, wherein
the first loop portion is disposed in a region of the first body at a side of the coupling portion; and
the second loop portion is disposed in a region of the second body at a side of the coupling portion.

5. A portable electronic device, comprising:
a body;
an antenna including a first loop portion and a second loop portion, each being disposed at a different position inside the body;
a first signal processing portion and a second signal processing portion that process signals received at the antenna, respectively;
a signal detection portion that is connected with the first signal processing portion and detects a first signal or a second signal received at the antenna; and
a control portion that, in a state in which a single loop antenna formed by the first loop portion and the second loop portion is connected with the signal detection portion, processes a signal received at the single loop antenna by way of the first signal processing portion in a case of the first signal being detected by the signal detection portion, and connects the first loop portion with the second signal processing portion and connects the second loop portion with the signal detection portion in a case of the second signal being detected by the signal detection portion, wherein the body includes a first face and a second face that face each other, the first loop portion being disposed at the first face of the body, the second loop portion being disposed at the second face of the body,
wherein the body includes:
a first body including the first face;
a second body including the second face; and
a coupling portion that couples the first body and the second body to be openable and closable around an opening-closing axis so as to be able to enter: a closed state in which the first body and the second body are disposed to be layered with a face of the first body on an opposite side to the first face and a face of the second body on an opposite side to the second face facing each other; and an opened state in which the first body and the second body are aligned in a predetermined direction with the first face and the second face being separated from each other, and
wherein, upon the single loop antenna being formed in the opened state, the first loop portion and the second loop portion are disposed at the first body or the second body, respectively, so as to suppress cancellation between the signal received at the first loop portion and the signal received at the second loop portion.

6. The portable electronic device according to claim 5, wherein
the control portion connects the first loop portion with the signal detection portion and connects the second loop portion with the second signal processing portion in a case of the second signal being detected by the signal detection portion that is connected with the second loop portion.

* * * * *